(12) United States Patent
Isberg et al.

(10) Patent No.: US 6,314,285 B1
(45) Date of Patent: *Nov. 6, 2001

(54) METHOD AND AN ARRANGEMENT RELATING TO EQUIPMENT IN TELECOMMUNICATION NETWORKS

(75) Inventors: Johanna Brita Isberg, Lund; Tomas Holmström, Dalby; Erik Sparre, Lomma, all of (SE)

(73) Assignee: Telefonaktiebolaget LM Ericsson, Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,407

(22) Filed: Jul. 7, 1998

(30) Foreign Application Priority Data

Jul. 8, 1997 (SE) .................................................. 9702640

(51) Int. Cl.⁷ ...................................................... H04Q 7/32
(52) U.S. Cl. ........................... 455/418; 455/419; 455/412; 455/550; 455/566; 455/351; 455/186.1
(58) Field of Search ..................................... 455/418, 419, 455/403, 412, 550, 551, 552, 422, 432, 433, 424, 566, 575, 564, 90, 351, 186.1, 7.32, 7.2

(56) References Cited

U.S. PATENT DOCUMENTS 5,373,551 12/1994 Baals et al. ........................ 379/110
5,630,159 5/1997 Zancho ............................... 395/800
5,835,858 * 11/1998 Vaihoja et al. ..................... 455/419

FOREIGN PATENT DOCUMENTS

| 19513573 | 10/1996 | (DE) | H04M/1/00 |
| 2731578 | 9/1996 | (FR) | H04Q/7/32 |
| 2262630 | 6/1993 | (GB) | G06F/15/403 |
| 2292047 | 2/1996 | (GB) | H04Q/7/02 |
| 2292653 | 2/1996 | (GB) | H04Q/7/32 |
| 2293951 | 4/1996 | (GB) | H04M/1/00 |
| 2305073 | 3/1997 | (GB) | H04Q/7/32 |
| 9525397 | 9/1995 | (WO) | H04M/1/72 |

* cited by examiner

*Primary Examiner*—William Trost
*Assistant Examiner*—Keith Ferguson
(74) *Attorney, Agent, or Firm*—Jenkens & Gilchrist A Professional Corporation

(57) ABSTRACT

The present invention comprises a method and means for setting a personal communication station into a selected operational mode, which comprises a pre-selected subset of operational settings within a superset of operational settings. The station is capable of communicating in at least one communication network. The method includes a sequence of steps, which begins with initiating the station (301). A first prompting message is then presented (302) to the user who is then requested to respond to the prompting message. The response (303) is then interpreted (304), whereby a negative response entails setting the station into a stand-by mode (305) and an affirmative response entails presenting a number of prompting messages (306), which requests a user to supply a number of responses (307) which comprise the operational settings in the pre-selected subset of operational settings.

19 Claims, 3 Drawing Sheets

METHOD AND AN ARRANGEMENT RELATING TO EQUIPMENT IN TELECOMMUNICATION NETWORKS

TECHNICAL FIELD OF THE INVENTION

The present invention relates to a method and an arrangement for setting a personal communication station, which is capable of communicating in telecommunication networks, into a selected operational mode.

DESCRIPTION OF RELATED ART

Personal communication stations, such as telephones in telephone networks and mobile telephones in cellular networks, often have a multitude of operational settings. There are settings dealing with the function of the station in its interaction with the network, and also settings that are more specific to the internal function of the station itself. Examples of the former are settings for handling transmission of text messages, barring of in- or outgoing calls and also settings for enabling and disabling DTMF signaling, as well as logging of the duration of calls. Typical examples of the latter type are volume and type of ring signal, internal clock setting and settings dealing with the appearance of the display.

The multitude of settings and options may even reach a limit where a user of the communication station finds it difficult to take advantage of the settings. In some cases the multitude may even give the user an impression of the station being too complex to use.

The difficulties pertaining to the complexity may be further accentuated by insufficiencies in the user interface of the communication station. A typical example being a small display unit unable to show more than a few characters of text.

A way of improving user-friendliness of personal communication stations that have a multitude of operational settings, and a limited capability of displaying information, is to assemble the settings into small and logically coherent groups of settings. Groups of settings are often administered by way of menus displayed on the display of the station, and manipulated through a keypad.

An example of prior art concerning grouping and administration of a complex multitude of operational settings in a mobile radio telephone can be found in the British patent application GB-2293951 (Sorensen et al., inventors). A dynamic menu system in a radio communication device includes menu items stored in a memory which is controlled by a controller. The memory holds a short menu and an extended menu. User input actuates the controller in order to select menu items from the extended menu and to add the items to the short menu.

The menu system disclosed in GB-2293951 does not offer a user of the device any alleviation from the complexity of locating a specific, and fairly small, subset of settings from the plethora of settings available in the extended menu.

SUMMARY OF THE INVENTION

A problem solved by the present invention is how to simplify personalisation of a personal communication station.

An object of the present invention is thus to enable a user of a personal communication station to set the station into an operational mode which comprises a number of operational settings.

Another object of the invention is to enable a user of a personal communication station to set the station into an operational mode at the time of activation of the station.

Yet another object of the invention is to enable a second user of a personal communication station to set the station into an operational mode which is different from an operational mode set by a first user.

Yet another object of the invention is to enable a user of a personal communication station, which is capable of multiple network communication, to set the station into an operational mode when switching from being connected to a first network to a second network.

The methods and means of the present invention are in essence a sequence of steps executed in a personal communication station, whereby a user, after initiation of the communication station, is prompted to select a number of operational settings. Alternatively, the settings are read from a user information unit in the station.

More specifically, the invention comprises a method and means for setting the personal communication station into a selected operational mode, which comprises a pre-selected subset of operational settings within a superset of operational settings. The station is capable of communicating in at least one communication network. The method includes a sequence of steps, which begins with initiating the station. Unless the subset of operational settings are read from an information unit, a first prompting message is presented to the user who is then requested to respond to the prompting message. The response is then interpreted, whereby a negative response entails setting the station into a stand-by mode and an affirmative response entails presenting a number of prompting messages, which requests a user to supply a number of responses comprising the operational settings in the pre-selected subset of operational settings.

An advantage of the present invention is that it simplifies the act of setting a personal communication station into an operational mode.

Another advantage is that the invention allows a novice user of a communication station to immediately after activation set the station into a desired operational mode, while at the same time an expert user can easily bypass the setting procedure.

Another advantage of the invention is that it is simple to implement in existing personal communication stations since it requires no hardware changes.

DETAILED DESCRIPTION OF PREFERRED EMBODIMENTS

Figure 1:
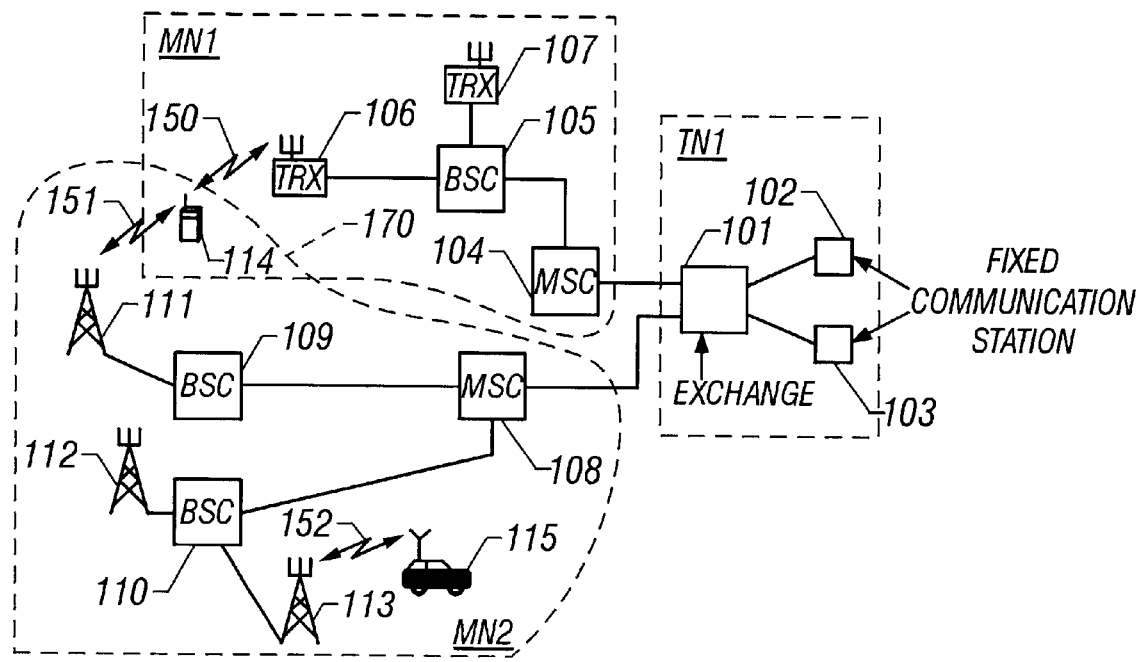
FIG. 1 shows a schematic view of telecommunication networks in which the present invention is implemented.

FIG. 1 is a schematic view of three interconnected telecommunication networks, wherein the present invention is preferably implemented. A fixed telephone network TN1 includes an exchange 101 with two connected communication stations, a first fixed communication station 102 and a second fixed communication station 103. The fixed communication stations 102,103 can be of any type known in the art, and a common example is of course a telephone.

A first mobile communication network MN1 includes a first mobile switching center 104 which is in connection with a first radio base station controller 105. The first radio base station controller 105 is connected to a first radio transceiver 106 and a second radio transceiver 107.

A second mobile communication network MN2 includes a second mobile switching center 10a which is in connection with a third radio base station controller 109 and a fourth radio base station controller 110. The third radio base station controller 109 is connected to a third radio transceiver 111. The fourth radio base station controller 110 is connected to a fourth radio transceiver 112 and a fifth radio transceiver 113.

The two mobile communication networks MN1,MN2 may be of any type known in the art, analogue such as e.g. the NMT and AMPS systems, and digital as e.g. the GSM, D-AMPS and PDC systems. The networks MN1,MN2 may also be of the digital cordless type such as the DECT system.

A geographical system overlap 170 can be also seen in FIG. 1. This overlap 170 illustrates that an area may have radio communication coverage by a number of different mobile systems. This is known in the art, and can be exemplified by a digital cordless system, such as the DECT system, present within a building which in turn is located within an area with GSM system coverage.

Within the two mobile communication networks MN1, MN2 are two mobile communication stations. A first personal communication station 114 and a second personal communication station 115. The first personal communication station 114 is capable of communicating within both the first mobile communication network MN1 and the second mobile communication network MN2 and is of a type which is known in the art as a dual-mode personal communication station, such as e.g. personal communication stations capable of communicating both in a DECT system and a GSM system. Communication stations capable of communicating in more than two networks are also known in the art. However, for the purpose of illustrating the invention, it is sufficient to discuss a dual-mode station. Transition from one mobile system to another while still upholding an established connection is possible and is also known in the art.

Users of personal communication stations, mobile 114, 115 and fixed 102,103, communicate within the networks MN1,MN2,TN1 in accordance with any method of communication relevant for each network. Establishing, maintaining and closing connections between units in the networks take place according to known art, and is only symbolically indicated in FIG. 1 by connections 150,151,152 between the mobile stations 114,115 and their respective radio tranceivers 106,111,113. It is thus to be understood that the present invention is not limited to communication networks of a particular type. The invention is relevant to analog systems such as NMT and AMPS as well as digital systems with time division (e.g. GSM and D-AMPS) and code division (CDMA) communication systems. Also, no preference for radio networks vis-à-vis fixed networks is implied.

Needless to say, mobile communication networks such as the ones illustrated in FIG. 1 (MN1 and MN2) usually cover large geographical areas and include many more units than shown here. Base stations may be counted in hundreds and mobile communication stations may be counted in millions.

Figure 2:
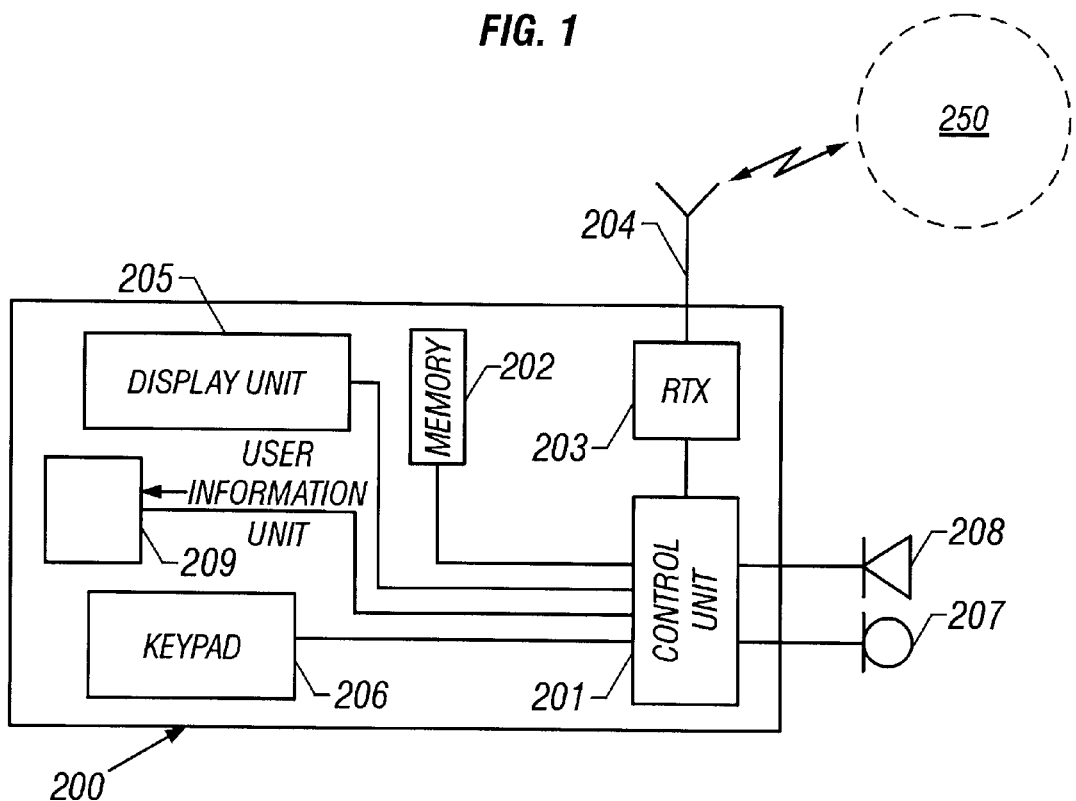
FIG. 2 shows a schematic view of a personal communication station in which the invention is implemented.

FIG. 2 illustrates schematically a personal communication station 200 with functional units known in the art. It may serve as an illustration to any of the mobile communication stations 114,115 in FIG. 1 and also be illustrative of any of the communication stations 102,103 in the fixed network TN1 in FIG. 1.

The personal communication station 200 includes a control unit 201 which is in connection with a memory unit 202, a radio transceiver unit 203 with an antenna 204, a display unit 205, a keypad 206, a microphone 207, a loudspeaker 208 and a user information unit 209.

The radio transceiver unit 203 with its antenna 204 is of course necessary for radio communication in a mobile communication network, such as the two networks MN1 and MN2 in FIG. 1. Radio communication between the station 200 and a mobile communication network 250 is only illustrated schematically. However, when the personal communication station is used in a fixed network, such as the network TN1 in FIG. 1, the radio transceiver unit 203 is superfluous, and preferably replaced by a suitable interfacing unit known in the art.

The control unit 201 controls the workings of the communication station 200 both when in a stand-by mode of operation and when communicating in any of the networks MN1,MN2,TN1. In practice the function of the control unit 201 is governed by software which can be stored in the control unit itself and also in the memory unit 202. The present invention is preferably implemented mainly by software running in the control unit 201. A detailed description of how the software acts on the different units in the communication station 200 is omitted due to the fact that it is known in the art. It is thus understood that the control unit 201 is capable of controlling information flow to and from e.g. the keypad 206, display 205, microphone 207, loudspeaker 208 and the memory 202 through the radio transceiver unit 203 to other stations in any of the communication networks MN1,MN2,TN1 as discussed above.

When the communication station 200 is activated, by e.g. switching on its power with a power switch (not shown in the figure), the control unit 201 initiates the station 200 and thereby prepares it for communication in a network MN1, MN2, TN1. A detailed discussion of the initiating procedure is unnecessary since it is known in the art and can be implemented in many different ways by the software running in the control unit 201. However, it should be pointed out that an initiation procedure may take place or command from a user of the station, by e.g. a key pressing action, at any time after the station 200 has been activated.

The user information unit 209 holds information about the present user of the personal communication station 200, and it can be a unit which is physically attachable and detachable from the communication station 200. The user information may be of different kinds and different extent, as will be described below. It should be noted, however, that information regarding the user may be present also in the memory unit 202.

When setting a communication station into an operational mode, which is in the field of the present invention, it is illustrative to exemplify an operational mode as being a selected combination of user settings which can be in the form of user information stored in the memory unit 202 and the user information unit 209. As is known in the art, user settings in personal communication stations may number in the hundreds, if not more. There are settings dealing with the performance of the station when communicating in a network, such as setting for handling transmission of text messages, barring of in- or outgoing calls and also settings for enabling and disabling DTMF signaling, as well as logging of the duration of calls. There are also settings that are more specifically directed to the station itself, and the personal preferences of the user of the station, such as volume and type of ring signal, internal clock setting and settings dealing with the appearance of the display. No exhaustive list of settings will be presented here, and it is thus understood that the present invention is applicable in personal communication stations regardless of which particular set of settings is available in the station.

Figure 3:
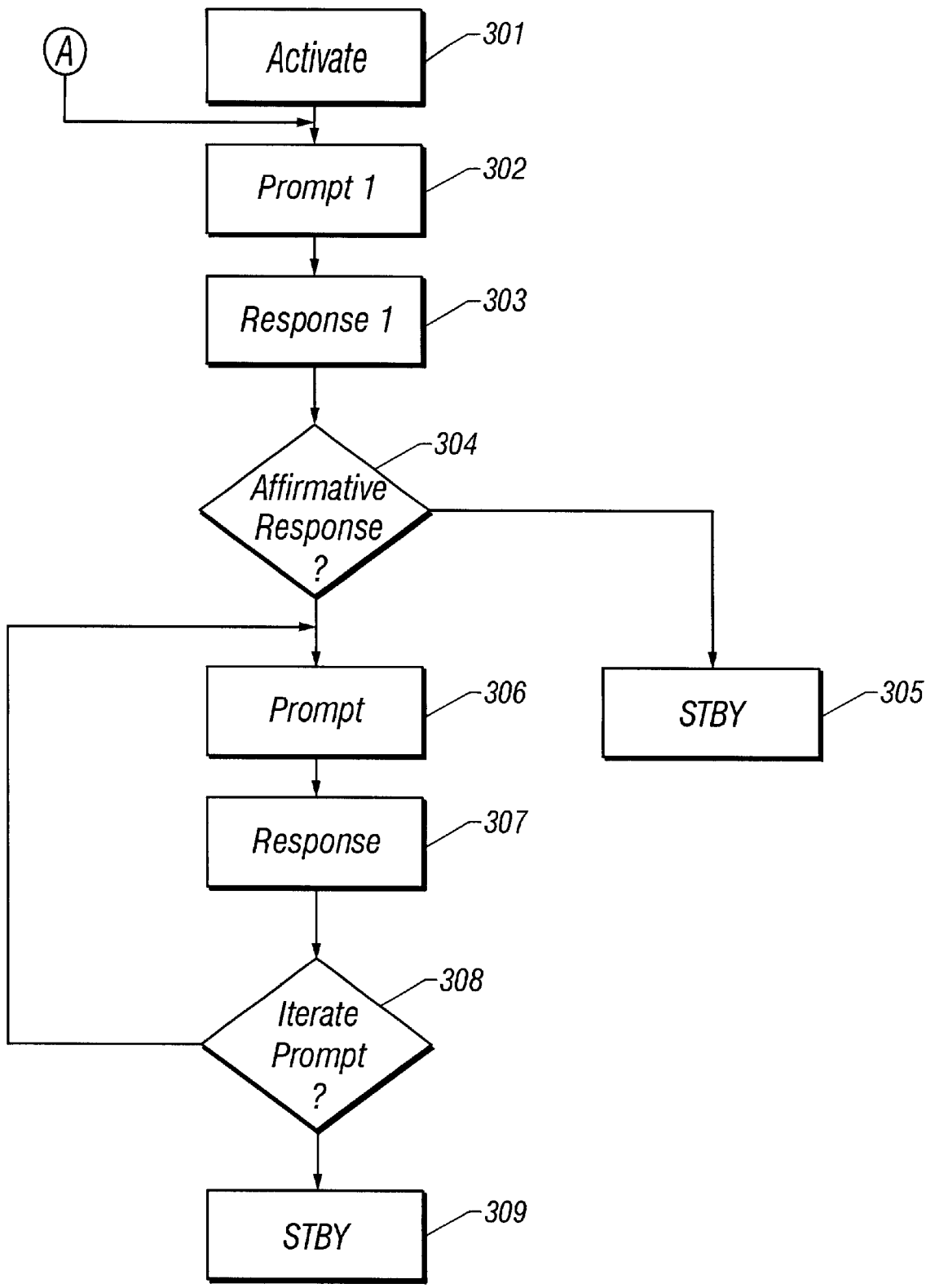
FIG. 3 shows a flowchart of a method according to the invention.

FIG. 3 illustrates a first preferred embodiment of a method according to the invention. The method is preferably realized in a personal communication station, such as the station 200 described above in connection with FIG. 2, using software running in the control unit 201. The communication station 200 is preferably used in a communication network such as any of the networks MN1,MN2,TN1 described in connection with FIG. 1.

In an activation step 301, the personal communication station 200 is activated. As is known in the art the activation may simply be an action of switching on the station 200 using an activation key on the keyboard 206. However, activation may also be performed by other actions known in the art, such as e.g. touching a touch sensitive display screen and activation by speaking into the microphone 207.

A first prompting step 302 follows directly after the activation step 301. During this step 302 a message is displayed on the display 205 prompting a user of the station 200 to make a decision and to supply an answer. The decision to make is whether to personalize the communication station or not. A decision to personalize entails continuing in a sequence of steps of setting a number of operational settings, as exemplified above. The sequence is predetermined and preferably stored in the memory 202 or the user information unit 209. Although the sequence of settings is predetermined it is possible to alter the sequence at will, but such an alteration is outside the scope of this invention and will not be discussed further.

Although the prompting message preferably is displayed on the display 205, other ways of prompting may be utilized. If suitably programmed, the control unit 201 may generate an acoustic prompting message through the speaker 208, such as e.g. a voice message.

Following the first prompting step 302 is a first response step 303. During this step the answer based an the decision is input to the communication station 200. Preferably the answer is typed on the keypad 206 using one or more keystrokes. However, an answer may also be input by an acoustic signal through the microphone 207 or generated by touching a touch sensitive display etc.

In the following, references to prompting and responding will be frequently occurring. It is to be understood that prompting can be obtained in any way as described in connection with the steps above.

In step 304 the control unit 201 interprets the answer given by the user. An affirmative answer entails continuing with a second prompting message in step 306, and a negative answer entails setting tale personal communication station into a stand-by mode in step 305.

A second prompting message is displayed in step 306. This step 306 is reached as a consequence of a decision by the user to personalize the communication station 200 and the message is hence prompting the user to set a setting to a desired value or level etc.

A second response step 307 follows, where the user inputs the selected value or level etc.

In step 308 the control unit 201 decides whether to iterate the previous two steps 306,307 or to finish and set the personal communication station go to a stand-by mode in step 309, ready for further operations. Preferably, when the predetermined sequence of settings is exhausted the stand-by mode 309 is entered. However, the user may at any iteration of the prompt and response steps 306 and 307 respond in such a manner that the stand-by mode is entered before the predetermined sequence is exhausted.

Figure 4:
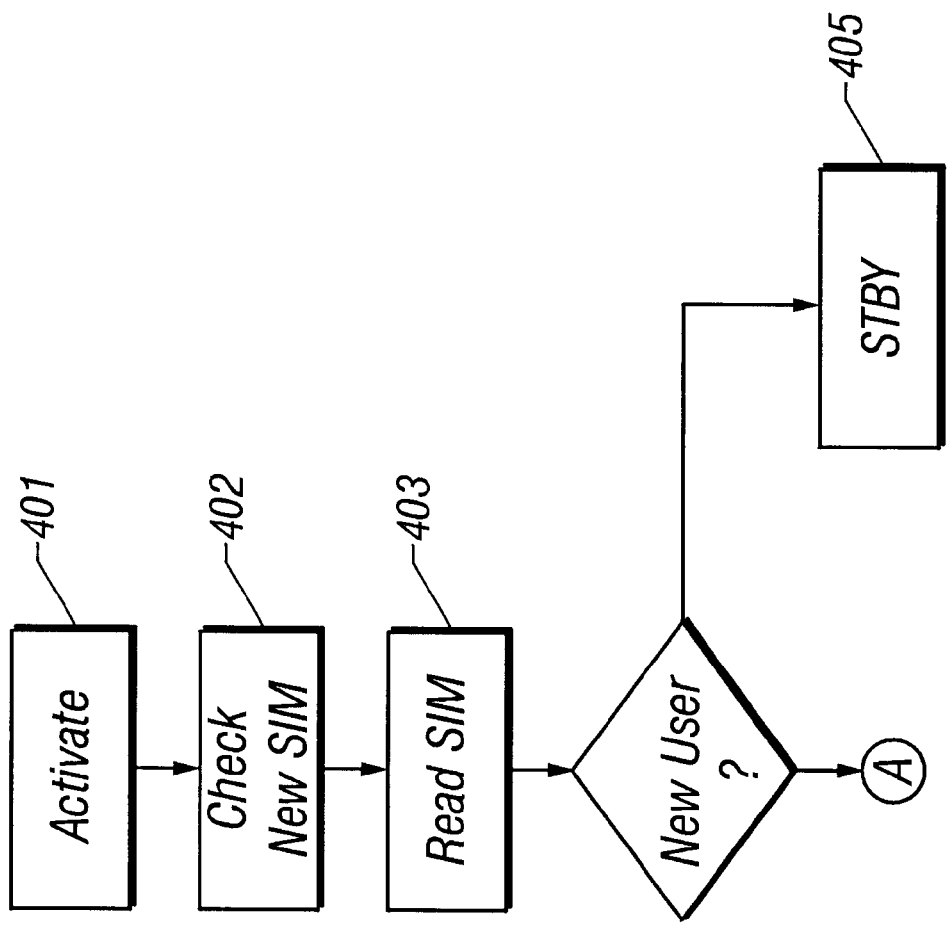
FIG. 4 shows a flowchart of an alternative method according to the invention.

FIG. 4 shows a second preferred embodiment of a method according to the invention. As in the previous example, a personal communication station 200 as described in connection with FIG. 2 is preferably used. It is assumed that the user information unit 209 is attachable to and detachable from the communication station 200. An example from known art is the so called SIM-cards used in connection with mobile telephones and which contain a multitude of user information such as subscriber identity and subscriber phone number. It is known that a personal communication station in the form of a mobile phone can be used by different users, each user having his own personal SIM-card. The following method will illustrate how each user will be prompted to personalize the communication station in accordance with a predetermined sequence of setting steps.

The method commences with an activation step 401 similar to the activation step 301 in the previous example.

In a following step 402 the control unit 231 checks if the user information unit 209, i.e. the SIM-card, has been replaced.

In step 403 information is read from the SIM-card. Preferably, information such as user identity is read. In a case where the SIM-card is capable of holding user information, such as the previously disclosed examples of volume and type of ring signal, the settings may be read from the SIM-card without further user interaction.

Depending on which user identity read from the SIM-card, the communication station 200 can either be set into a stand-by mode ready for operation in step 405, possibly having read preferences from the SIM-card or continue with a setting sequence in accordance with FIG. 3, as indicated by figure reference A in FIGS. 4 and 3. It is assumed that the control unit 201 is capable of reading a previous user identity from the memory unit 202 in order to determine if a new user is operating the communication station 200.

Figure 5:
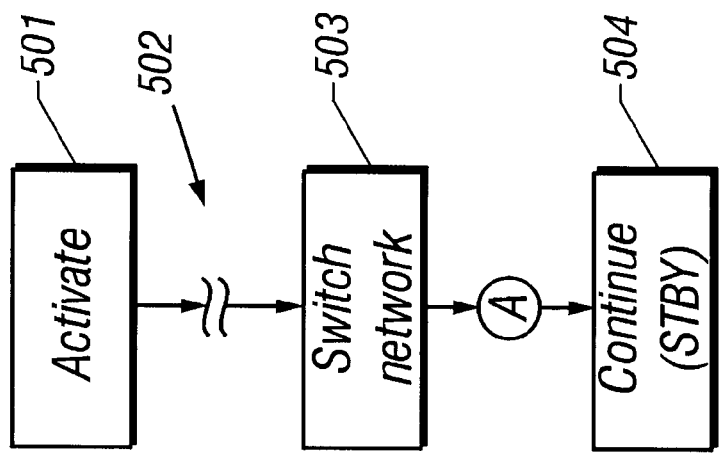
FIG. 5 shows a flowchart of a second alternative method according to the invention.

FIG. 5 illustrates a third preferred embodiment of the present invention. As in the previous examples a personal communication station 200 as described in connection with FIG. 2 is used. The communication station 200 is in this example of a dual-mode type capable of communication in at least two different communication networks. As described above, multi-mode units are known in the art and will not be discussed in detail. Switching between communication with one network to a second network can be achieved automatically, controlled by the control unit 201, and also on demand from a user of the communication station 200. In the latter case the user demand can be realized by e.g. a key pressing action on the keypad 206.

The method commences with an activation step 501 similar to the activation steps 301,401 in the previous examples.

Then follows a period of operation 502 during which any activities pertaining to communication using the personal communication station 200 in the first mobile communication network MN1 (FIG. 1) takes place.

At a point in time the control unit 201 switches the communication station 200 from being in contact with the first network MN1 to be in contact with the second mobile communication network MN2 (FIG. 1). The switching between networks may occur as a consequence of a user of the station deciding to switch network, and pressing a key on the keypad 206. The switch may also occur more or less automatically as a result from a decision by the control unit 201, based on e.g. measured network parameters such as signal strength etc. The switching between networks is illustrated by a step 503.

Then follows the sequence of personalisation steps as described in connection with FIG. 3, as indicated by the figure reference A in FIGS. 5 and 3.

In step 504 this third implementation of a method according to the invention, returns to a stand-by mode of operation in the second mobile network MN2 (FIG. 1).

Another way of illustrating the present invention could be in terms of a more generalized environmental change, sensed by the control unit of the station, resulting in a personalisation sequence as described above. One particular example along these lines is a scenario in which a user of a hand-held mobile communication station connects the station to a car connection unit which enables the user to use the station while driving. In such a case, the actual connection of the communication station to the car connection unit initiates the station and triggers a personalisation sequence as described in the examples above.

What is claimed is:

1. A method for setting a personal communication station into a selected operational mode, said selected operational mode comprising a preselected subset of operational settings within a superset of operational settings, said personal communication station capable of communicating in at least one communication network, and presenting and controlling the preselected subset of operational settings, said method comprising the steps of:

initiating the personal communication station;
   presenting a first prompting message regarding whether to set the personal communication station into the preselected subset of operational settings;
   requesting a response to the first prompting message;
   responding to the first prompting message by way of an answer having one of two states, one of the states being affirmative and the other state being negative;
   interpreting the response, where the negative state answer entails setting the personal communication station into a stand-by mode, and the affirmative state answer entails presenting at least one second prompting message regarding the preselected subset of operational settings; and
   responding to the at least one second prompting message, said response comprises at least one operational setting in the preselected subset of operational settings.

2. The method according to claim 1, where the personal communication station is capable of communicating in at least a first and a second communication network, and said step of initiating is followed by a step of determining with which communication network the personal communication station is in contact.

3. The method according to claim 2, wherein said step of determining further includes reading a network identity from an information unit.

4. The method according to claim 1, wherein said step of initiating further includes an initiating action by a user of the personal communication station.

5. The method according to claim 4, wherein the initiating action by a user of the personal communication station further includes a key pressing action.

6. The method according to claim 1, wherein the step of initiating is performed as a consequence of detecting a change of operating environment.

7. The method according to claim 6, where the personal communication station is a mobile communication station and said change of operating environment includes one of the actions of connecting and disconnecting the mobile station to a vehicle.

8. A personal communication station capable of being set to a selected operational mode, said selected operational mode comprising a preselected subset of operational settings within a superset of operational settings, said personal communication station comprising means for communicating in at least one communication network, and means for presenting and controlling the preselected subset of operational settings, said personal communication station comprising:

means for initiating the personal communication station;
   means for presenting a first prompting message regarding whether to set the personal communication station into the preselected subset of operational settings;
   means for requesting a response to the first prompting message;
   means for responding to the first prompting message by way of an answer having one of two states, one of the states being affirmative and the other state being negative;
   means for interpreting the response, where the negative state answer entails setting the personal communication station into a stand-by mode, and the affirmative state answer entails presenting at least one second prompting message regarding the preselected subset of operational settings; and
   means for responding to the at least one second prompting message, said response comprises at least one operational setting in the preselected subset of operational settings.

9. The personal communication station according to claim 8, wherein said means for initiating further includes means for activating the personal communication station.

10. The personal communication station according to claim 8, wherein said means for initiating further includes at least one key.

11. The personal communication station according to claim 8, wherein said means for initiating further includes means for detecting a change of operating environment.

12. The personal communication station according to claim 11, wherein the personal communication station is a mobile communication station and said means for detecting a change of operating environment further includes means for connecting and disconnecting the mobile communication station to a vehicle.

13. The method according to claim 1, wherein the step of initiating further includes activating the personal communication station.

14. The method according to claim 1, further comprising determining an identity of a user of the personal communication station.

15. The method according to claim 14, wherein said step of determining further includes reading the identity of the user from an information unit.

16. The personal communication station according to claim 8, further includes means for determining an identity of a user of the personal communication station.

17. The personal communication station according to claim 16, wherein said means for determining includes means for reading the identity of the user from an information unit.

18. The personal communication station according to claim 8, further comprising:
   means for communicating in at least a first and a second communication network; and
   means for determining with which communication network the personal communication station is in contact.

19. The personal communication station according to claim 18, wherein said means for determining includes means for reading a network identity from an information unit.

* * * * *

UNITED STATES PATENT AND TRADEMARK OFFICE
CERTIFICATE OF CORRECTION

PATENT NO.    : 6,314,285 B1
DATED         : November 6, 2001
INVENTOR(S)   : Isberg et al.

It is certified that error appears in the above-identified patent and that said Letters Patent is hereby corrected as shown below:

Column 3,
Line 7, replace "10a" with -- 108 --

Column 4,
Line 41, replace "or" with -- on --
Line 61, replace "setting" with -- settings --

Column 5,
Line 54, replace "tale" with -- the --
Line 66, replace "go to" with -- into --

Column 6,
Line 23, replace "231" with -- 201 --

Signed and Sealed this

Seventeenth Day of September, 2002

Attest:

JAMES E. ROGAN
Attesting Officer    Director of the United States Patent and Trademark Office